United States Patent [19]

Urban

[11] 4,254,883

[45] Mar. 10, 1981

[54] AMPUL

[75] Inventor: Joseph J. Urban, Richboro, Pa.

[73] Assignee: Hoechst-Roussel Pharmaceuticals Inc., Somerville, N.J.

[21] Appl. No.: 51,252

[22] Filed: Jun. 22, 1979

[51] Int. Cl.³ .............................................. B65D 1/02
[52] U.S. Cl. ........................................ 215/32; 225/1
[58] Field of Search .................. 215/6, 31, 32, 33, 34, 215/35, 36; 225/1, 2, 96.5

[56] References Cited

U.S. PATENT DOCUMENTS

| | | | |
|---|---|---|---|
| 1,382,163 | 6/1921 | Beccari | 215/32 |
| 2,324,237 | 7/1943 | Reichel | 215/32 |
| 2,372,181 | 3/1945 | Barr | 215/33 |
| 2,638,022 | 5/1953 | Reyes | 225/96.5 X |
| 3,013,686 | 12/1961 | Blunt | 215/31 |
| 3,375,948 | 4/1968 | Creevy | 215/32 |
| 3,459,185 | 8/1969 | Bender | 215/32 X |
| 3,750,645 | 8/1973 | Bennett | 215/6 X |

Primary Examiner—Donald F. Norton
Attorney, Agent, or Firm—Raymond R. Wittekind

[57] ABSTRACT

An improved ampul is disclosed. The ampul of this invention comprises a hollow tubular or cylindrical container composed of glass or other breakable material having a reservoir chamber and an upstanding wall portion terminating in a sealable stem or tip portion, and includes a collecting chamber located between the reservoir chamber and stem portion. Upon breaking of the ampul above the collecting chamber, any particles so formed are trapped in the collecting chamber and thus introduction of such matter into the contents of the ampul is markedly reduced.

12 Claims, 4 Drawing Figures

AMPUL

BACKGROUND OF THE INVENTION

The present invention relates to an improved ampul for packaging medicaments and the like which is constructed and designed to minimize introduction of particulate matter into the contents of the ampul when the hermetically sealed ampul is opened by breaking.

Ampuls have long been used for the sterile packaging of medicaments in powdered or liquid form, and particularly for the packaging of medicaments intended for parenteral administration to the patient. Conventional ampuls may be constructed of glass or a breakable non-siliceous material and comprise a hollow tubular container composed of a reservoir chamber portion having a closed bottom and an upstanding wall portion terminating in a sealable tapered stem. A neck-like constriction around the circumference of the side wall above the reservoir chamber is provided to serve as a locus for opening a sealed ampul by breaking it and also to minimize spilling of the contents of the ampul after breaking. Most ampuls used today are pre-scored or stressed around the side wall circumference at this neck-like constriction to weaken the side wall at that point in order to further facilitate breaking when the sealed ampul is to be opened. Examples of prior art patents relating to ampuls, to their design, and to techniques for facilitating fractures are U.S. Pat. Nos. 2,297,335, 3,063,267, 3,375,948, 3,535,070, and 3,719,463.

Minute particles of material from which a breakable ampul is constructed may be formed when the ampul is broken at the neck area. Introduction of such matter, e.g. glass particles, into the contents of the ampul is to be avoided.

It is thus an object of this invention to provide an ampul wherein introduction of particulate matter into the contents of the ampul formed by opening of the ampul is greatly reduced.

Still another object of the invention is to provide a method for opening the ampuls of the present invention to minimize introduction of particulate matter into the contents of the ampul such particles being formed as a result of opening.

SUMMARY OF THE INVENTION

These and other objects of the invention may be achieved by providing a modified version of a conventional ampul containing a collecting chamber located between a reservoir chamber and a sealable or sealed stem portion of the ampul, said collecting chamber being defined by upper and lower neck-like constrictions of the circumference of the wall of the ampul, and said ampul further adapted for breaking at the upper neck-like constriction between the collecting chamber and the stem portion. It has been found that when sealed ampuls of the present invention are opened by breaking above the collecting chamber, any particles, e.g. glass particles, formed by breaking are confined to an area defined by inner wall surfaces of the collecting chamber and do not pass through the lower neck-like constriction of this chamber into the reservoir chamber of the ampul. Accordingly, introduction of particulate matter into the contents of the ampul is greatly reduced.

DETAILED DESCRIPTION OF THE INVENTION

Figure 1:
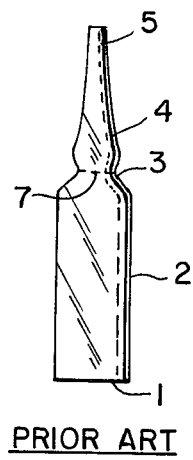
FIG. 1 is an elevation partial section view of a common prior art ampul.

Referring now to FIG. 1, a common prior art ampul is shown which ampul is not within the scope of the claimed invention. This ampule is basically a hollow tubular or cylindrical container composed of a reservoir chamber 2 having a closed bottom 1 and an upstanding wall portion terminating in a sealable stem portion 5. Contiguous with the stem portion is holding chamber 4 which is separated from the reservoir chamber by a neck-like constriction of the wall portion at 3. Most commonly the prior art ampuls are pre-stressed or scored around their circumference at constriction 3 to facilitate breaking which stress line is indicated at 7. A sealed ampul is opened by grasping it with one hand at holding chamber 4 and with the other hand at reservoir chamber 2 and subjecting it to a bending moment around neck 3 to cause a preferable breaking along stress line 7.

Figure 2:
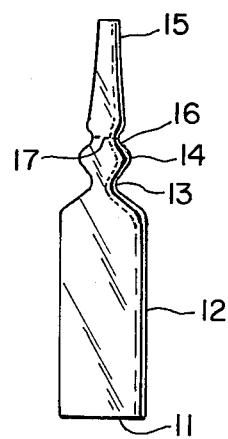
FIG. 2 is an elevation partial section view of a first embodiment of the ampul of the present invention.

FIG. 2 illustrates the design of an ampul which forms one embodiment of this invention. This design comprises a hollow, tubular container composed of a reservoir chamber portion 12 having a closed bottom 11 contiguous with an upstanding wall portion which terminates in a sealable open stem portion 15. The container includes a collecting chamber 14 located between reservoir chamber 12 and stem 15, with the boundaries of said collecting chamber defined by upper neck-like constriction 16 of the upstanding wall on the stem side of the ampul and lower neck-like constriction 13 of the upstanding wall on the reservoir chamber side of the ampul. The ampul is pre-stressed or scored at 17 around at least a portion of the circumference of the upstanding wall portion at neck-like constriction 16 to promote severance of stem portion 15 from collecting chamber portion 14 of the ampul.

Figure 3:
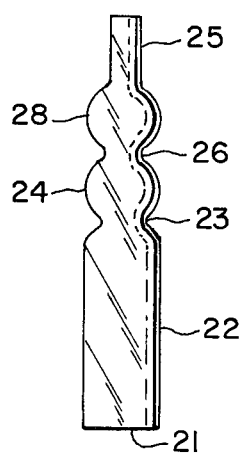
FIG. 3 is an elevation partial section view of a second embodiment of the ampul of the present invention.

FIG. 3 illustrates still another design falling within the scope of this invention. This ampule is similar to FIG. 2 except that it includes a third holding chamber to facilitate grasping the stem portion of the ampul when it is to be broken, and the ampul need not necessarily be pre-stressed at the time of manufacture. The ampul is composed basically of a hollow tubular container composed of three separate chambers, said container having a closed bottom 21 contiguous with an upstanding tubular wall portion, a first reservoir chamber 22 defined by the closed bottom and a first neck-like constriction 23 of the circumference of the upstanding wall portion, a collecting chamber 24 defined by constriction 23 and a second neck-like constriction 26 of the circumference of the upstanding wall portion. The ampul also includes a holding chamber 28 which is part of or contiguous with sealable stem portion 25 and defined at its extremity opposite said stem portion by neck-like constriction 26. Although this particular design need not necessarily be pre-stressed, it is preferable that the ampul be scored or otherwise stressed at upper neck-like constriction 26 to facilitate breaking at this point.

The transverse diameter or width of the collecting chamber and/or holding chamber of the ampuls of FIGS. 2 and 3 is greater than the transverse diameter or width of the neck-like constrictions, although it is not necessary that all chambers or all neck-like constrictions be of the same diameter or width. Preferably, the ampuls are fabricated such that the outside diameter or width of the neck-like constriction at its narrowest point between the collecting chamber and reservoir chamber is within the range of about 40 to 85% of the outside diameter or width of the collecting chamber at its widest point. Obviously, the various neck-like constrictions must have inside diameters sufficiently wide to facilitate filling of the ampul and to allow for the insertion of a needle or other device to remove the contents of the reservoir chamber after opening.

Figure 4:
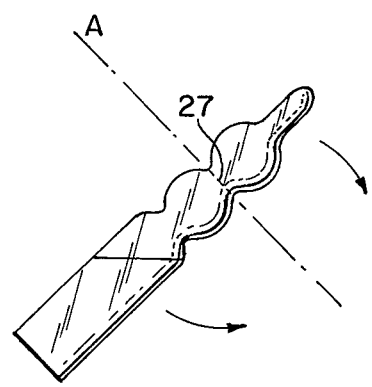
FIG. 4 is an elevation partial section view of a sealed ampul similar to FIG. 3 depicted in the preferred fracture position.

FIG. 4 illustrates the sealed ampul of FIG. 3 positioned at an approximately 45° angle to the horizontal which is the most suitable for a fracture that will minimize introduction of particulate matter formed as the result of breaking into the contents of the ampul. The ampul is pre-stressed at 27. Breaking may be accomplished at 27 by applying pressure with each hand such that the ampul is subjected to a bending moment around axis line A as illustrated by the force direction of the arrows, thereby separating the stem portion from the collecting chamber portion of the ampul.

Although the designs illustrated in FIGS. 2 and 3 are preferred, it is to be emphasized that the ampuls of the present invention may be composed of more than one collecting chamber, i.e., two or more of such chambers. In such case the collecting chamber itself would be in the shape of a figure eight with an additional neck-like constriction located between first and second neck-like constrictions illustrated at 23 and 26 respectively in FIG. 3. However, such construction is less preferred because it requires the use of an ampul having an unduly long stem and the additional benefit in terms of reducing introduction of particulate matter into the contents of the ampul are not sufficient to override the disadvantages.

The ampuls of the present invention may be constructed from any heat shapable material which is commonly used in the manufacture of containers. Representative materials include glass such as borosilicate or soda-lime glasses, plastics such as polymethylmethacrylate, polyolefins, polyvinylchloride and the like, rubber materials such as butyl, natural and silicone rubbers, and ceramics. The capacities of the reservoir chamber of the ampuls generally are from about 0.5 ml to about 50 ml., with 2 to 10 ml. being the most common size. Glass is the most common material used in the manufacture of ampuls because it is the most inert with regard to medicaments packaged therein.

The ampuls may be manufactured by any of the known heat forming processes such as blow molding or by a heat drawing process using bottle stock or tubing stock as the starting material. The various techniques for manufacturing ampuls are considered within the skill of the art and are discussed, for example, in U.S. Pat. No. 2,297,446 and 3,375,948. The average wall thickness of the ampul will generally lie within the range of about 0.005 to 0.100 inch, such range being dependent on ampul capacity. In the case of glass, the preferred wall thickness is about 0.025 inch.

In most cases it is desirable to pre-stress the ampul at the time of manufacture to facilitate breaking or opening of the ampul for dispensation of the medicaments contained therein. By the term "pre-stress" is meant either a chemical or mechanical treatment of the wall of the ampul at the point of intended breaking, i.e., at the upper neck-like constriction 16 in FIG. 2 or 26 in FIG. 3, which weakens the wall at that location relative to other structural locations. Such pre-stressing may take the form of mechanical scoring of at least a portion of the circumference of the ampul using a file or other cutting device, or by treatment with a chemical etching agent such as disclosed in U.S. Pat. No. 3,535,070. Stress may also be induced in glass ampuls by coating the neck area with another glass material, usually color coded to indicate the stress line of breaking, which glass material will be fused to the ampul wall to form a positive bond and which glass material has a rate of contraction differing from that of the glass of the ampul or a total thermal expansion greater than that of the glass of the ampul. Such a technique is taught in U.S. Pat. No. 2,517,604. Yet another technique involves bombarding the neck area with abrasive particles such as taught in U.S. Pat. No. 3,063,267. Ampuls having a design as shown in FIG. 3 need not necessarily be pre-stressed at the time of manufacture but may be mechanically scored by the user at upper neck-like constriction 26 just prior to breaking.

The ampuls are generally supplied to the medicament packager in the form shown in FIGS. 2 and 3 with the stem portion opened. They are cleaned, sterilized, the reservoir is filled with medicament and typically the stem is sealed by the packager to form a hermetically sealed container such as shown in FIG. 4. Prior to administering the medicament, the ampul is opened and the collecting chamber or chambers thereof collect or trap the particulate matter which results from the breaking.

What I claim is:

1. An ampul comprising a hollow, tubular container composed of a reservoir chamber having a closed bottom contiguous with an upstanding wall portion terminating in a sealable open stem portion and including an unobstructed, spherical collecting chamber located between said reservoir chamber and said stem portion, the boundaries of said unobstructed, spherical collecting chamber defined by upper and lower neck-like constrictions of the circumference of said upstanding wall portion such that the width of said unobstructed, spherical collecting chamber is greater than the traverse width of said neck-like constrictions for trapping particulate matter formed by opening the ampul, said upper neck-like constriction being pre-stressed to promote severance of the stem portion from the collecting chamber portion of said ampul.

2. The ampul of claim 1 wherein said container is composed of glass.

3. The ampul of claim 2 wherein said stem portion is heat-sealable.

4. An ampul comprising a hollow tubular container composed of at least three separate chambers, said container having a closed bottom contiguous with an upstanding tubular wall portion terminating in a sealable stem portion, said ampul having:
(a) a first reservoir chamber defined by said closed bottom and a first neck-like constriction of the circumference of said upstanding wall portion, (b) at least one unobstructed, spherical collecting chamber defined by said first neck-like constriction and a second neck-like constriction at the circumference of said upstanding wall portion for trapping particulate matter formed upon breaking the ampul, and (c) a holding chamber contiguous with said sealable stem portion and defined by said neck-like constriction, the transverse diameter of each of said chambers at the widest point being greater than the transverse diameter of said neck-like constriction.

5. The ampul of claim 4 wherein said neck-like constriction is pre-stressed to promote severance of the holding chamber and stem portion from the unobstructed, spherical collecting chamber portion of said ampul.

6. The ampul of claim 4 wherein said container is composed of glass.

7. The ampul of claim 6 wherein said stem portion is heat-sealable.

8. A method for breaking an ampul composed of a hollow tubular container composed of a breakable material and having a reservoir chamber portion with a closed bottom contiguous with an upstanding wall portion terminating in a sealed stem portion, and including an unobstructed, spherical collecting chamber defined by upper and lower neck-like constrictions of the circumference of said upstanding wall portion for trapping particulate matter formed upon breaking the ampul, said method comprising holding said ampul at an angle to the horizontal and subjecting said ampul to a bending movement inwardly towards the upper neck-like constriction to cause breaking thereof at said upper neck-like constriction, thereby separating the stem portions from the unobstructed, spherical collecting chamber portion of said ampul.

9. The method of claim 8 wherein said ampul is pre-stressed at said upper neck-like constriction prior to being subjected to said bending moment.

10. The method of claim 9 wherein said container is composed of glass.

11. The method of claim 8 wherein said ampul is held at an angle of about 45° to the horizontal.

12. An ampul which comprises (a) a reservoir chamber comprising a closed portion of the ampul for maintaining the contents of the ampul; (b) a stem portion of the ampul for sealing the ampul and the contents therein; and (c) at least one unobstructed, spherical collecting chamber connecting said reservoir chamber to said stem portion for trapping particulate matter formed upon breaking of the ampul, said at least one unobstructed, spherical collecting chamber defined by upper and lower constrictions in the wall of the ampul and having a transverse width greater than the transverse width of said constrictions.

* * * * *

UNITED STATES PATENT AND TRADEMARK OFFICE
CERTIFICATE OF CORRECTION

PATENT NO. : 4,254,883
DATED : March 10, 1981
INVENTOR(S) : Joseph J. Urban

It is certified that error appears in the above—identified patent and that said Letters Patent is hereby corrected as shown below:

In the Claims:

Claim 1, line 50. The expression "that the width of said unobstructed," should read----that the transverse width of said unobstructed,----.

Claim 4, line 8. The expression "said neck-like" should read----said second neck-like----.

Claim 5, line 12. The expression "said neck-like" should read----said second neck-like----.

Claim 8, lines 26 and 27. The expression "defined by upper and lower neck-like constrictions" should read----located between said reservoir chamber and said stem portion, the boundaries of said unobstructed, spherical collecting chamber defined by upper and lower neck-like constrictions----.

Claim 8, line 4. The term "movement" should read----moment----.

Claim 8, line 6. The term "portions" should read----portion----.

Signed and Sealed this

Sixth Day of October 1981

[SEAL]

Attest:

GERALD J. MOSSINGHOFF

*Attesting Officer*  *Commissioner of Patents and Trademarks*